(12) United States Patent
Kuzyakov et al.

(10) Patent No.: US 10,692,187 B2
(45) Date of Patent: Jun. 23, 2020

(54) SYSTEMS AND METHODS FOR PRESENTING CONTENT

(71) Applicant: Facebook, Inc., Menlo Park, CA (US)

(72) Inventors: Evgeny V. Kuzyakov, San Jose, CA (US); Chetan Parag Gupta, Menlo Park, CA (US); Renbin Peng, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/488,482

(22) Filed: Apr. 16, 2017

(65) Prior Publication Data

US 2018/0302590 A1    Oct. 18, 2018

(51) Int. Cl.

| | | |
|---|---|---|
| G06T 5/00 | (2006.01) | |
| H04N 21/442 | (2011.01) | |
| H04N 21/4402 | (2011.01) | |
| H04N 21/4728 | (2011.01) | |
| H04N 21/81 | (2011.01) | |
| G06K 9/46 | (2006.01) | |
| G06K 9/32 | (2006.01) | |
| G06T 3/00 | (2006.01) | |
| G06T 11/60 | (2006.01) | |

(52) U.S. Cl.
CPC ............ *G06T 5/002* (2013.01); *G06K 9/3233* (2013.01); *G06K 9/4671* (2013.01); *G06T 3/0062* (2013.01); *G06T 11/60* (2013.01); *H04N 21/44218* (2013.01); *H04N 21/440245* (2013.01); *H04N 21/4728* (2013.01); *H04N 21/816* (2013.01)

(58) Field of Classification Search
CPC ......... H04N 7/0117; H04N 21/440245; H04N 21/44218; H04N 21/816; H04N 21/4728; G06K 9/2054; G06K 9/4671; G06K 9/3233; G06T 5/002; G06T 11/60; G06T 3/0062
See application file for complete search history.

(56) References Cited

U.S. PATENT DOCUMENTS 5,931,908 A    8/1999  Gerba
9,445,047 B1   9/2016  Frueh
(Continued)

FOREIGN PATENT DOCUMENTS

| EP | 3147758 | 3/2017 |
|---|---|---|
| WO | 2016207861 | 12/2016 |
| WO | 2017060423 | 4/2017 |

OTHER PUBLICATIONS

Xu et al., Turkergaze: Crowdsourcing saliency with webcam based eye trackin. May 20, 2015 (Year: 2015).*

(Continued)

*Primary Examiner* — Kunal Langhnoja
(74) *Attorney, Agent, or Firm* — Sheppard Mullin Richter & Hampton LLP

(57) ABSTRACT

Systems, methods, and non-transitory computer-readable media can determine that a content item is being presented through a display screen of the computing device. Information describing one or more salient points of interest that appear during presentation of the content item are determined, wherein the salient points of interest are predicted to be of interest to one or more users accessing the content item. The presentation of at least a first salient point of interest is enhanced during presentation of the content item based at least in part on the information.

19 Claims, 13 Drawing Sheets

(56) References Cited

U.S. PATENT DOCUMENTS

| | | |
|---|---|---|
| 2007/0245397 A1 | 10/2007 | James |
| 2008/0101456 A1 | 5/2008 | Ridge |
| 2012/0254195 A1 | 10/2012 | Hammoud |
| 2015/0373281 A1 | 12/2015 | White |
| 2016/0004931 A1 | 1/2016 | Andreopoulos |
| 2016/0191796 A1 | 6/2016 | Mate |
| 2016/0282624 A1 | 9/2016 | Munger |
| 2017/0026577 A1 | 1/2017 | You |
| 2017/0237976 A1 | 8/2017 | Matias |
| 2017/0308770 A1* | 10/2017 | Jetley .................. G06K 9/6256 |
| 2017/0367651 A1* | 12/2017 | Tzvieli .................. A61M 21/02 |

OTHER PUBLICATIONS

Xu et al., TurkerGaze: Crowdsourcing saliency with webcam based eye tracking. May 20, 2015 (Year: 2015) (Year: 2015).*
U.S. Appl. No. 15/144,695, filed May 2, 2016.
International Application No. PCT/US2017/028009, International Search Report and Writtten Opinion dated Jan. 8, 2018.
European Patent Application No. 17196590.8, Search Report dated Jan. 5, 2018.

* cited by examiner

SYSTEMS AND METHODS FOR PRESENTING CONTENT

FIELD OF THE INVENTION

The present technology relates to the field of content provision. More particularly, the present technology relates to techniques for presenting content through computing devices.

BACKGROUND

Today, people often utilize computing devices (or systems) for a wide variety of purposes. Users can operate their computing devices to, for example, interact with one another, create content, share content, and access information. Under conventional approaches, content items (e.g., images, videos, audio files, etc.) can be made available through a content sharing platform. Users can operate their computing devices to access the content items through the platform. Typically, the content items can be provided, or uploaded, by various entities including, for example, content publishers and also users of the content sharing platform. In some instances, the content items can be categorized and/or curated.

SUMMARY

Various embodiments of the present disclosure can include systems, methods, and non-transitory computer readable media configured to determine that a content item is being presented through a display screen of the computing device, determine information describing one or more salient points of interest that appear during presentation of the content item, wherein the salient points of interest are predicted to be of interest to one or more users accessing the content item, and cause the presentation of at least a first salient point of interest to be enhanced during presentation of the content item based at least in part on the information.

In some embodiments, the systems, methods, and non-transitory computer readable media are configured to increase the video quality at which a region corresponding to the first salient point of interest is presented by some specified amount.

In some embodiments, the systems, methods, and non-transitory computer readable media are configured to increase a zoom level of a region corresponding to the first salient point of interest by some specified amount.

In some embodiments, the region corresponds to the contours of the first salient point of interest.

In some embodiments, the systems, methods, and non-transitory computer readable media are configured to cause regions other than the region corresponding to the first salient point of interest to appear blurred by some threshold amount.

In some embodiments, the systems, methods, and non-transitory computer readable media are configured to cause a portion of the first salient point of interest to appear at a higher quality than the remaining portions of the first salient point of interest.

In some embodiments, one or more frames corresponding to the first salient point of interest are encoded so that regions of the frames corresponding to the first salient point of interest are presented at a higher quality than the remaining regions of the frames.

In some embodiments, the content item is a virtual reality content item created by stitching together a set of video streams that capture one or more scenes.

In some embodiments, the systems, methods, and non-transitory computer readable media are configured to obtain information describing the salient points of interest from a saliency prediction model that is trained to predict salient points of interest that appear during presentation of content items.

In some embodiments, the systems, methods, and non-transitory computer readable media are configured to obtain information describing the salient points of interest from aggregated heat map data corresponding to the content item.

Various embodiments of the present disclosure can include systems, methods, and non-transitory computer readable media configured to determine saliency information describing one or more salient points of interest that appear during presentation of a content item, wherein the salient points of interest are predicted to be of interest to one or more users accessing the content item and embed the saliency information describing the salient points of interest into the content item, wherein the saliency information is capable of being processed during presentation of the content item to enhance the presentation of the content item.

In some embodiments, the systems, methods, and non-transitory computer readable media are configured to insert a respective portion of the saliency information into at least some of the frames of the content item.

In some embodiments, the portion of the saliency information inserted in a frame provides information describing one or more salient points of interest that appear in the frame.

In some embodiments, the information describing the salient points of interest that appear in the frame includes respective pixel coordinates for each of the salient points of interest.

In some embodiments, the information describing the salient points of interest that appear in the frame includes respective locations of the salient points of interest that appear in the frame and corresponding filters to be applied to the salient points of interest, wherein a filter augments the appearance of a salient point of interest during presentation of the content item.

In some embodiments, the information describing the salient points of interest that appear in the frame describes respective regions in the frame that correspond to each of the salient points of interest, wherein a region corresponding to a salient point of interest is defined using at least a set of pixel coordinates and a radius that originates from the pixel coordinates.

In some embodiments, the portion of the saliency information inserted into a frame provides information describing a view direction corresponding to the frame.

In some embodiments, the saliency information for a frame is inserted into a non-visible expansion region of the frame.

In some embodiments, the systems, methods, and non-transitory computer readable media are configured to insert one or more color sequences in the frame, wherein each color sequence is capable of being translated to determine the saliency information.

In some embodiments, the systems, methods, and non-transitory computer readable media are configured to obtain information describing the salient points of interest from a saliency prediction model that is trained to predict salient points of interest that appear during presentation of content items.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
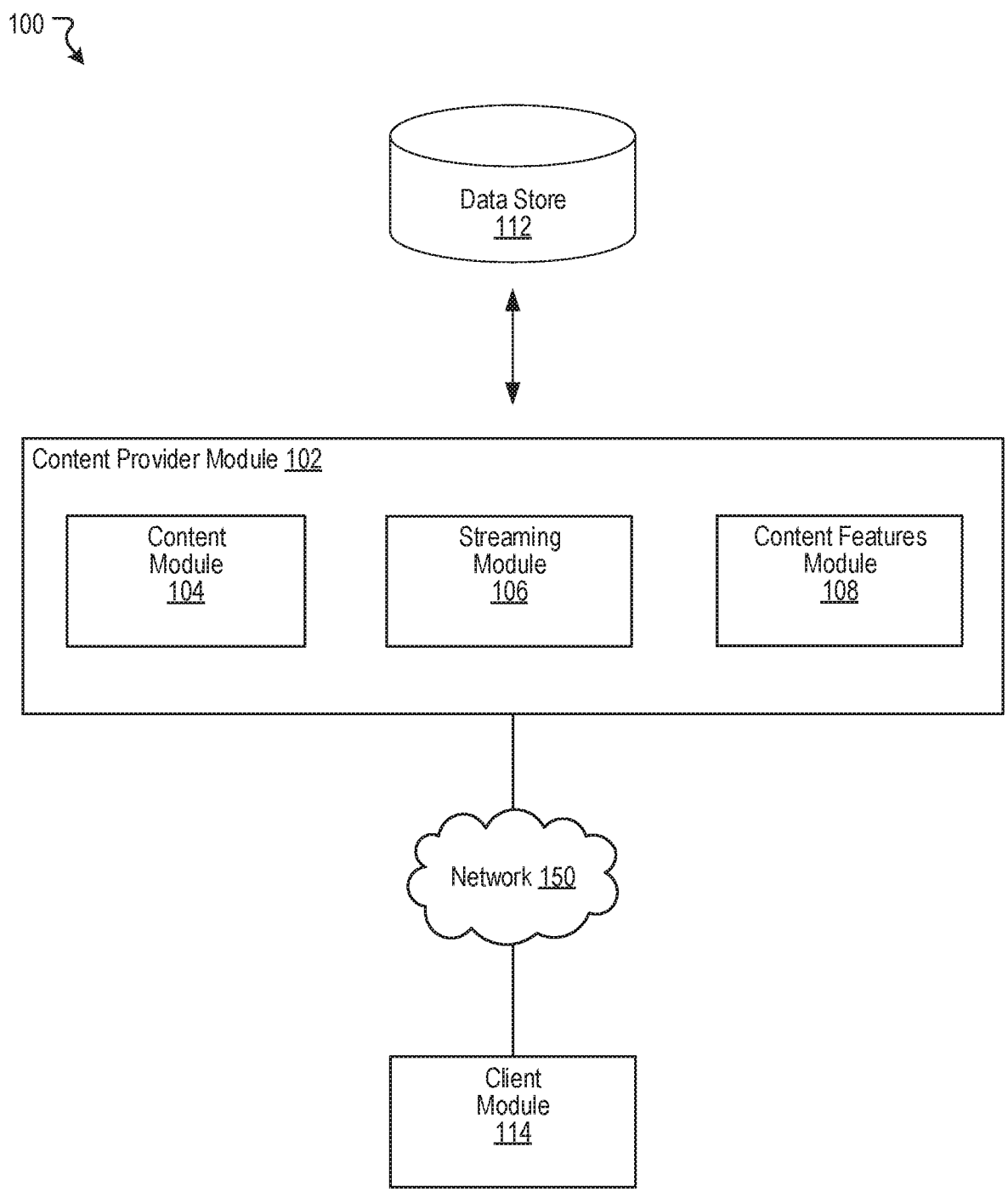
FIG. 1 illustrates an example system including an example content provider module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Presenting Content

People use computing devices (or systems) for a wide variety of purposes. As mentioned, under conventional approaches, a user can utilize a computing device to share content items (e.g., documents, images, videos, audio, etc.) with other users. Such content items can be made available through a content sharing platform. Users can operate their computing devices to access the content items through the platform. Typically, the content items can be provided, or uploaded, by various entities including, for example, content publishers and also users of the content sharing platform.

In some instances, a user can access virtual reality content through a content provider. Such virtual reality content can be presented, for example, in a viewport that is accessible through a computing device (e.g., a virtual reality device, headset, or any computing device capable of presenting virtual reality content). In general, a virtual reality content item (or immersive video) corresponds to any virtual reality media that encompasses (or surrounds) a viewer (or user). Some examples of virtual reality content items include spherical videos, half sphere videos (e.g., 180 degree videos), arbitrary partial spheres, 225 degree videos, and 3D 360 videos. Such virtual reality content items need not be limited to videos that are formatted using a spherical shape but may also be applied to immersive videos formatted using other shapes including, for example, cubes, pyramids, and other shape representations of a video recorded three-dimensional world. In some embodiments, a virtual reality content item can be created by stitching together various video streams (or feeds) that were captured by cameras that are placed at particular locations and/or positions to capture a view of the scene (e.g., 180 degree view, 225 degree view, 360 degree view, etc.). Once stitched together, a user can access, or present (e.g., playback), the virtual reality content item. Generally, while accessing the virtual reality content item, the user can zoom and change the direction (e.g., pitch, yaw, roll) of the viewport to access different portions of the scene in the virtual reality content item. The direction of the viewport can be used to determine which stream of the virtual reality content item is presented.

In general, a content item (e.g., virtual reality content item) may capture scenes that include various points of interest (e.g., persons, objects, landscapes, etc.). In some instances, conventional models (e.g., neural network) can be trained to evaluate the content item to identify points of interest appearing in scenes (e.g., frames) during presentation (e.g., playback) of the content item. Although conventional approaches can be used to identify a number of different points of interest in a given content item, these conventional approaches are typically unable to indicate which of these identified points of interest are likely to be relevant (or interesting) to a given user or a group of users. Accordingly, such conventional approaches may not be effective in addressing these and other problems arising in computer technology.

An improved approach overcomes the foregoing and other disadvantages associated with conventional approaches. In various embodiments, a saliency prediction model can be trained to identify content that is likely to be of interest to users (e.g., salient points of interest) during presentation of a given content item. In some embodiments, the content predicted by the saliency prediction model is expected to be more relevant, or interesting, to a given user or group of users (e.g., users sharing one or more demographic attributes). In some embodiments, these salient points of interest can be used to improve the delivery (or streaming) of the content item. For example, in some embodiments, salient points of interest appearing in a frame of a content item can be enhanced during presentation of the content item. In some embodiments, such enhancements may involve presenting regions corresponding to the salient points of interest at a higher quality. In some embodiments, these enhancements may involve presenting the salient points of interest at a higher zoom level. As a result, more resources can be allocated to presenting content that is more likely to be viewed by users during presentation of a content item.

FIG. 1 illustrates an example system 100 including an example content provider module 102, according to an embodiment of the present disclosure. As shown in the example of FIG. 1, the content provider module 102 can include a content module 104, a streaming module 106, and a content features module 108. In some instances, the example system 100 can include at least one data store 112. A client module 114 can interact with the content provider module 102 over one or more networks 150 (e.g., the Internet, a local area network, etc.). The client module 114 can be implemented in a software application running on a computing device (e.g., a virtual reality device, headset, or any computing device capable of presenting virtual reality content). In various embodiments, the network 150 can be any wired or wireless computer network through which devices can exchange data. For example, the network 150 can be a personal area network, a local area network, or a wide area network, to name some examples. The components (e.g., modules, elements, etc.) shown in this figure and all figures herein are exemplary only, and other implementations may include additional, fewer, integrated, or different components. Some components may not be shown so as not to obscure relevant details.

In some embodiments, the content provider module 102 can be implemented, in part or in whole, as software, hardware, or any combination thereof. In general, a module, as discussed herein, can be associated with software, hardware, or any combination thereof. In some implementations, one or more functions, tasks, and/or operations of modules can be carried out or performed by software routines, software processes, hardware, and/or any combination thereof. In some cases, the content provider module 102 can be implemented, in part or in whole, as software running on one or more computing devices or systems, such as on a user computing device or client computing system. For example, the content provider module 102, or at least a portion thereof, can be implemented as or within an application (e.g., app), a program, or an applet, etc., running on a user computing device or a client computing system, such as the user device 710 of FIG. 7. Further, the content provider module 102, or at least a portion thereof, can be implemented using one or more computing devices or systems that include one or more servers, such as network servers or cloud servers. In some instances, the content provider module 102 can, in part or in whole, be implemented within or configured to operate in conjunction with a social networking system (or service), such as the social networking system 730 of FIG. 7. It should be understood that there can be many variations or other possibilities.

In some embodiments, the content provider module 102 can be configured to communicate and/or operate with the at least one data store 112 in the example system 100. In various embodiments, the at least one data store 112 can store data relevant to the function and operation of the content provider module 102. One example of such data can be content items (e.g., virtual reality content items) that are available for access (e.g., streaming). In some implementations, the at least one data store 112 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 112 can store information associated with users, such as user identifiers, user information, profile information, user specified settings, content produced or posted by users, and various other types of user data. It should be appreciated that there can be many variations or other possibilities.

In various embodiments, the content module 104 can provide access to various types of content items (e.g., virtual reality content items, immersive videos, etc.) to be presented through a viewport. This viewport may be provided through a display of a computing device (e.g., a virtual reality computing device) in which the client module 114 is implemented, for example. In some instances, the computing device may be running a software application (e.g., social networking application) that is configured to present content items. Some examples of virtual reality content can include videos composed using monoscopic 360 degree views or videos composed using stereoscopic 180 degree views, to name some examples. In various embodiments, virtual reality content items can capture views (e.g., 180 degree views, 225 degree views, 360 degree views, etc.) of one or more scenes over some duration of time. Such scenes may be captured from the real world and/or be computer generated. Further, a virtual reality content item can be created by stitching together various video streams (or feeds) that were captured by cameras that are placed at particular locations and/or positions to capture a view of the scene. Such streams may be pre-determined for various directions, e.g., angles (e.g., 0 degree, 30 degrees, 60 degrees, etc.), accessible in a virtual reality content item. Once stitched together, a user can access, or present, the virtual reality content item to view a portion of the virtual reality content item along some direction (or angle). Generally, the portion of the virtual reality content item (e.g., stream) shown to the user can be determined based on the location and direction of the user's viewport in three-dimensional space. In some embodiments, a virtual reality content item (e.g., stream, immersive video, spherical video, etc.) may be composed using multiple content items. For example, a content item may be composed using a first content item (e.g., a first live broadcast) and a second content item (e.g., a second live broadcast).

In one example, the computing device in which the client module 114 is implemented can request presentation of a virtual reality content item (e.g., spherical video). In this example, the streaming module 106 can provide one or more streams of the virtual reality content item to be presented through the computing device. The stream(s) provided will typically correspond to a direction of the viewport in the virtual reality content item being accessed. As presentation of the virtual reality content item progresses, the client module 114 can continually provide the content provider module 102 with information describing the direction at which the viewport is facing. The streaming module 106 can use this information to determine which stream to provide the client module 114. For example, while accessing the virtual reality content item, the client module 114 can notify the content provider module 102 that the viewport is facing a first direction. Based on this information, the streaming module 106 can provide the client module 114 with a first stream of the virtual reality content item that corresponds to the first direction.

In some embodiments, the content features module 108 provides a number of different features for enhancing the presentation of content items. For example, in some embodiments, the content features module 108 can generate a saliency prediction model that can be used to identify salient points of interest in a given content item. The content features module 108 can use the identified salient points of interest to improve the presentation of the content item. More details describing the content features module 108 will be provided below in reference to FIG. 2.

Figure 2:
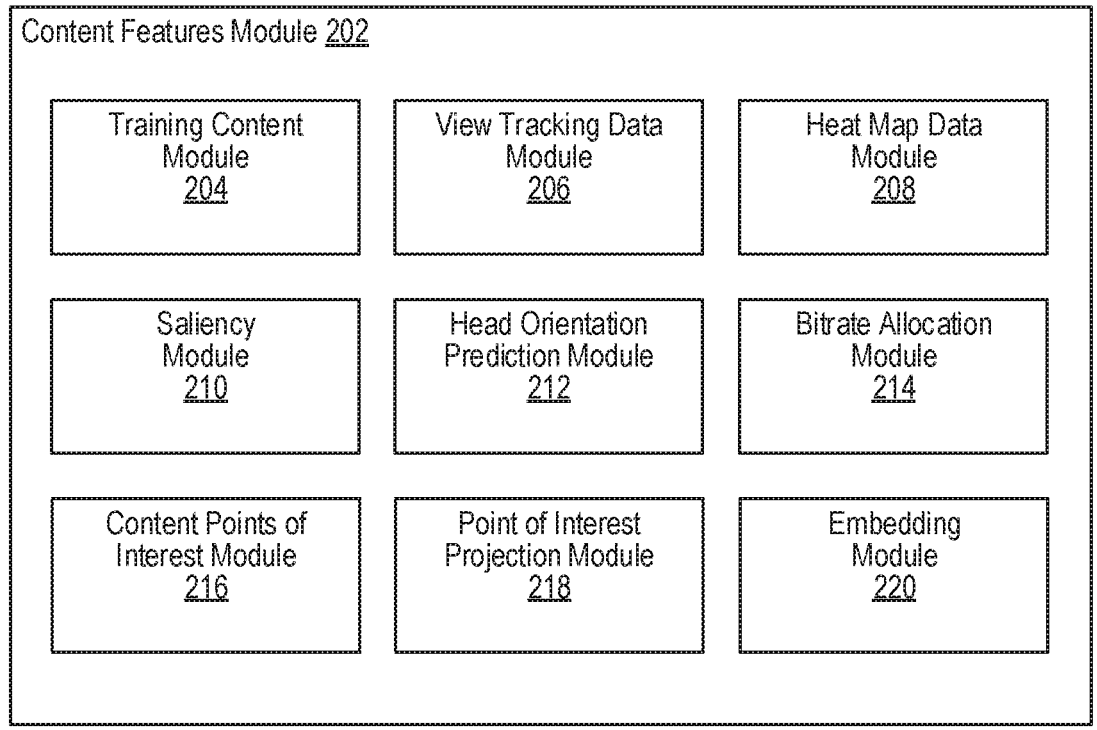
FIG. 2 illustrates an example of a content features module, according to an embodiment of the present disclosure.

FIG. 2 illustrates an example of a content features module 202, according to an embodiment of the present disclosure. In some embodiments, the content features module 108 of FIG. 1 can be implemented with the content features module 202. As shown in the example of FIG. 2, the content features module 202 can include a training content module 204, a view tracking data module 206, a heat map data module 208, a saliency module 210, a head orientation prediction module 212, a bitrate allocation module 214, a content points of interest module 216, a point of interest projection module 218, and an embedding module 220.

In various embodiments, the training content module 204 can be configured to obtain content items to be used for training one or more models (e.g., saliency prediction models). Such content items may include videos (e.g., virtual reality content items, immersive videos, etc.). In general, a virtual reality content item (or immersive video) corresponds to any virtual reality media that encompasses (or surrounds) a viewer (or user). Some examples of virtual reality content items include spherical videos, half sphere videos (e.g., 180 degree videos), arbitrary partial spheres, 225 degree videos, and 3D 360 videos. Such virtual reality content items need not be limited to videos that are formatted using a spherical shape but may also be applied to immersive videos formatted using other shapes including, for example, cubes, pyramids, and other shape representations of a video recorded three-dimensional world.

The content items obtained by the training content module 204 can vary depending on the type of model being trained. For example, in some embodiments, a general saliency prediction model may be trained using various unrelated content items that were created by various publishers and corresponding heat map data for those content items. This general saliency prediction model can be used to determine salient points of interest in various types of content items. In some embodiments, a publisher-specific saliency prediction model may be trained using content items that were posted by a given publisher (e.g., content creator) and corresponding heat map data for those content items. This publisher-specific saliency prediction model can be used to determine salient points of interest in content that is subsequently posted by that publisher. In some embodiments, a category-specific saliency prediction model may be trained using content items that all correspond to a given category (e.g., genre, topic, interest, etc.) and corresponding heat map data for those content items. This category-specific saliency prediction model can be used to determine salient points of interest in new content items that correspond to the given category.

In some embodiments, the view tracking data module 206 can be configured to obtain respective view tracking data for each of the content items being used to train the models. For example, view tracking data for a given content item may be collected for each user (or viewer) that has accessed the content item. The view tracking data for a user may identify regions that were accessed through the user's viewport during presentation of the content item. Such view tracking data may be collected for each frame corresponding to the content item. In some embodiments, a user's view tracking data for a content item can be determined based on changes to the user's viewport during presentation of the content item. Such changes to the viewport may be measured using various approaches that can be used either alone or in combination. For example, changes to the viewport may be measured using sensor data (e.g., gyroscope data, inertial measurement unit data, etc.) that describes movement of the computing device being used to present the content item. In another example, changes to the viewport can be measured using gesture data describing the types of gestures (e.g., panning, zooming, etc.) that were performed during presentation of the content item. Some other examples for measuring changes to the viewport include using input device data that describes input operations (e.g., mouse movement, dragging, etc.) performed during presentation of the content item, headset movement data that describes changes in the viewport direction during presentation of the content item, and eye tracking data collected during presentation of the content item, to name some examples.

In some embodiments, the heat map data module 208 can be configured to generate (or obtain) heat maps for each of the content items being used to train the models. In some embodiments, heat maps for a given content item may be generated based on view tracking data for the content item. As mentioned, the view tracking data module 206 can obtain respective view tracking data for users that viewed a content item. Each user's view tracking data can indicate which regions of a given frame (or set of frames) were accessed using a user's viewport during presentation of a content item. That is, for any given frame in the content item, the heat map data module 208 can generate (or obtain) user-specific heat maps that graphically represent regions in the frame that were of interest to a given user. In some embodiments, heat maps can be generated for a set of frames that correspond to some interval of time. For example, a respective heat map can be generated for every second of the content item. In some embodiments, user-specific heat maps for a given content item can be combined to generate aggregated heat maps that represent aggregated regions of interest in frames corresponding to the content item. Thus, for example, the respective user-specific heat maps can be aggregated on a frame-by-frame basis so that each frame of the content item is associated with its own aggregated heat map that graphically identifies the regions of interest in the frame. These regions of interest can correspond to various points of interest that appear in frames and were determined to be of interest to some, or all, of the users that viewed the content item. In some embodiments, these regions of interest can correspond to various points of interest that appear in frames and were determined to be of interest to users sharing one or more common characteristics with the user who is to view the content item.

In some embodiments, the saliency module 210 can be configured to train a saliency prediction model. In such embodiments, the saliency prediction model can be used to identify content (e.g., points of interest) that is likely to be of interest to a given user accessing a content item in which the identified content appears. For example, the saliency prediction model can determine that a first point of interest which appears in a given frame of a content item is likely to be of interest to a user over a second point of interest that also appears in the frame. In some embodiments, the saliency prediction model is trained using the content items that were obtained by the training content module 204 and their respective aggregated heat maps. For example, in some embodiments, each frame of a content item and its corresponding aggregated heat map can be provided as a training example to the saliency prediction model. In some embodiments, the saliency prediction model is trained using aggregated heat map data that has been labeled to identify points of interest. The aggregated heat map can be used to identify regions of the frame that were viewed more than others. Such view activity can be represented in the aggregated heat map using various shapes that describe the size of the view region and/or colors that indicate concentrations of view activity in any given region of the frame. Based on this information, the saliency prediction model can learn which pixels in the frame were interesting (or relevant) to users in the aggregate. In some embodiments, pixels in the frame that fall within the shapes and/or colors represented in the aggregated heat map can be identified as being interesting (or relevant) to users in the aggregate. In some embodiments, these pixels correlate to points of interest that appear in frames. As a result, the saliency prediction model can learn which points of interest appearing in a frame were of interest to users in the aggregate with respect to other points of interest that also appear in the frame. Once trained, the saliency prediction model can be used to identify content (e.g., points of interest) that is likely to be of interest in new content items. In some embodiments, the saliency prediction model can be used to predict salient points of interest for stored content items (e.g., video on-demand). In some embodiments, the saliency prediction model can be used to predict salient points of interest (e.g., points of interest that are likely to be of interest) for live content items (e.g., live video broadcasts).

In various embodiments, heat map data, aggregated or otherwise, need not be actual heat maps that are represented graphically but may instead be some representation of view tracking data. For example, in some embodiments, the heat map data may identify clusters of view activity within individual frames of content items. In some embodiments, the clusters of view activity that are identified from heat map data can be used independently to identify salient points of interest in various content items. For example, in some embodiments, heat map data identifying clusters of view activity in frames during a live video broadcast (e.g., over the past n seconds of the broadcast) can be used to identify salient points of interest that appear in subsequent frames.

The ability to predict salient content (e.g., points of interest) in new content items provides a number of advantages. For example, in some embodiments, the head orientation prediction module 212 can be configured to determine changes to a user's head orientation during presentation of a given content item. In such embodiments, the content item (or frames of the content item) being viewed can be provided as input to the saliency prediction model that was trained by the saliency module 210. The saliency prediction model can output information indicating which content in the frames is likely to be of interest to the user viewing the content item. In general, the user's head orientation (e.g., viewport) is expected to align with regions in the frames that include content that is likely to be of interest. In some embodiments, predicted changes to the user's head orientation can be used to improve streaming of the content item. For example, in some embodiments, the predicted changes to the user's head orientation can be used to improve view dependent streaming of the content item. In some embodiments, the predicted changes to the user's head orientation can be used to improve dynamic streaming of the content item. For example, in some embodiments, rather than generating all of the possible viewports for a content item, which may include content that is not expected to be viewed by a user, only viewports that correspond to the predicted directions of the user's head orientation during presentation of a content item can be generated.

In some embodiments, the bitrate allocation module 214 can be configured to allocate more bits (or macroblocks) to regions in a frame that include content (e.g., points of interest) that is determined to be of interest. The additional allocation of bits to a given region in a frame allows that region to be presented in higher quality over other regions in the frame. In some embodiments, such content can be determined using a saliency prediction model as described above. For example, the content item (or frames of the content item) being viewed can be provided as input to the saliency prediction model. The saliency prediction model can output information indicating which content in the frames is likely to be of interest to the user viewing the content item. The regions in the frame that correspond to content that is likely to be of interest can be allocated a greater number of bits over other regions in the frame. The actual number of bits allocated among the various regions of a frame can vary depending on the implementation. As a result, a user's data usage while streaming the content item can be throttled while allowing more bits to be allocated for the more interesting regions in the frames.

In some embodiments, the content points of interest module 216 can be configured to score content (e.g., points of interest) that appears in frames of a content item. For example, in some embodiments, content in a frame can be scored based on an aggregated heat map that reflects user view activity for the frame. As mentioned, an aggregated heat map for a frame can identify the respective amounts of view activity corresponding to various regions (or points of interest) in the frame. Such view activity can be represented in the aggregated heat map using various shapes that describe the size of the view region and/or colors that indicate concentrations of view activity in any given region of the frame. In some embodiments, content (e.g., points of interest) in the frame is scored with respect to the shapes and/or colors represented in the aggregated heat map. For example, content (e.g., points of interest, salient points of interest, etc.) that appears in a region having a threshold concentration of view activity, as measured by the aggregated heat map, can be scored higher than content in other regions that received less view activity.

In some embodiments, the point of interest projection module 218 can be configured to enhance the presentation of salient points of interest that appear in content items. For example, in some embodiments, upon accessing a virtual reality content item (e.g., immersive video, spherical video, etc.), data corresponding to low resolution versions of streams corresponding to all of the viewable directions in the virtual reality content item are provided to a computing device accessing the virtual reality content item. This data can be stored (or cached) for use during presentation of the spherical video. In such embodiments, the computing device can notify the point of interest projection module 218 when the viewport is facing a given direction. Based on this information, the point of interest projection module 218 can provide the computing device with a higher resolution version of the stream corresponding to the given direction.

In some embodiments, the point of interest projection module 218 can enhance the video quality of regions corresponding to salient points of interest that appear in frames over other regions in the frames that do not include salient points of interest. For example, given a frame having a region that includes a salient point of interest and another region that includes a non-salient point of interest, the point of interest projection module 218 can increase the quality at which the region corresponding to the salient point of interest is presented by some threshold (or specified) amount over the region corresponding to the non-salient point of interest. In some embodiments, the frame can be encoded so that the region that corresponds to the salient point of interest is encoded at a higher quality than the region that corresponds to the non-salient point of interest. In some embodiments, the point of interest projection module 218 can enhance the video quality of certain regions corresponding to a given salient point of interest over other regions of the salient point of interest. For example, if an individual has been identified as a salient point of interest that appears in a given frame, the point of interest projection module 218 can increase the quality at which the individual's face is presented by some threshold (or specified) amount over other regions in the frame. In some embodiments, these certain regions may be determined based on aggregated heat map data (or view tracking data) for the frames.

In some embodiments, the point of interest projection module 218 can cause salient points of interest in frames to be presented at a higher zoom level (e.g., zoomed-in) over the remaining regions (or non-salient points of interest) that appear in the frames. For example, a frame that includes a first salient point of interest (e.g., an individual) and a second salient point of interest (e.g., another individual) can be presented so that both the first salient point of interest and the second salient point of interest appear at a higher zoom level than the remaining portions of the frame. In some embodiments, the point of interest projection module 218 may offset cubemaps corresponding to the frames so that the salient points of interest appear at a higher zoom level than the remaining portions of the frames. In some embodiments, content to be enhanced by the point of interest projection module 218 in a given frame of a content item can be specified by a publisher of the content item. This information can be embedded into the frame, as described below.

In various embodiments, the embedding module 220 can be configured to embed information (e.g., metadata) into frames of content items. The embedded information can include any type of information that helps to improve the delivery and/or presentation of a given content item. Such embedding allows relevant information to be sent with the content data (e.g., frames) without having to be separately transmitted. In some embodiments, information can be embedded into some, or all, of the frames of a content item. In some embodiments, the information embedded in a given frame can vary depending on the frame. For example, in some embodiments, the information embedded in a frame can describe points of interest that appear in the frame (e.g., respective pixel coordinates of the points of interest). In some embodiments, the information embedded in a frame can describe a view direction corresponding to the frame (e.g., pitch, yaw, etc.). In some embodiments, the information embedded in a frame can describe saliency information that is obtained from a saliency prediction model. In such embodiments, the information can describe salient points of interest that appear in the frame. For example, the information can identify respective pixel coordinates of the salient points of interest in the frame. In some embodiments, the information embedded in a frame can indicate a respective radius for each point of interest and/or salient point of interest that appears in the frame. The radius and coordinates for a given salient point of interest can be used to define a region in the frame that corresponds to the salient point of interest. In some embodiments, the information embedded in a frame can describe actions to be applied when presenting the frame. For example, in some embodiments, the information embedded in a frame can describe the respective locations of points of interest that appear in the frame and corresponding filters to be applied to the points of interest. Such filters may instruct a computing device to augment the appearance of a given point of interest, for example, by applying overlays and/or masks. In various embodiments, such embedded information can be extracted from frames of a content item during presentation and be used to present the individual frames through a computing device.

In some embodiments, information may be embedded in a frame as one or more lines of color sequences. For example, in some embodiments, a color sequence line includes a red color segment, a green color segment, and a blue color segment. In such embodiments, a color segment is displayed to indicate a value of 1 and not displayed to indicate a value of 0. Thus, in such embodiments, each color sequence line includes three color segments which can each be displayed or not displayed. As a result, each color sequence line can be used to represent a 3-bit string. For example, a color sequence line in which the red color segment, green color segment, and blue color segment are displayed will correlate to a "111" bit string. In another example, a color sequence line in which the red color segment is displayed, green color segment is not displayed, and blue color segment is displayed will correlate to a "101" bit string. Naturally, the number of lines of color sequences, the colors used, and the number of color segments can vary depending on the implementation. Moreover, color segments are provided as just one example approach for embedding information and, depending on the implementation, such information may be embedded using other techniques. In some embodiments, information may be embedded in non-visible regions of a frame (e.g., non-visible expansion regions) so that the information is not visible to users. In some embodiments, information may be embedded in regions that are unlikely to be viewed by users during presentation of a content item. For example, as mentioned, saliency information for a content item may be used to determine changes to a user's head orientation during presentation of the content item. In this example, information can be embedded in regions that are not likely to be viewed by users. In one example, the information can be embedded in a video stream corresponding to a region located behind a user's viewport.

Figure 3A:
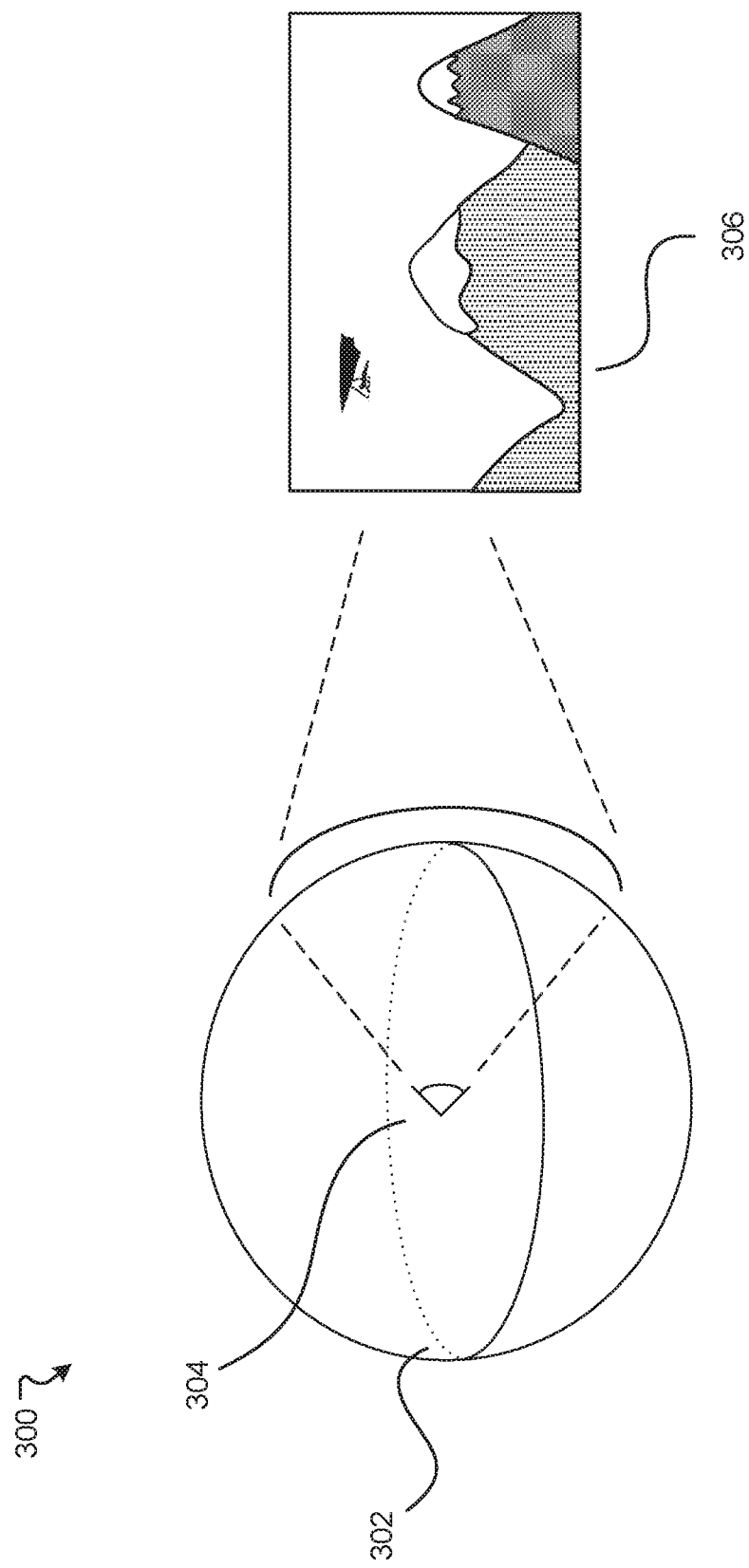
FIGS. 3A-F illustrate examples of streaming a virtual reality content item, according to an embodiment of the present disclosure.

FIG. 3A-F illustrate examples of streaming a virtual reality content item, according to an embodiment of the present disclosure. FIG. 3A illustrates an example 300 of a viewport 304 displaying a portion of a video stream 306 of a spherical video. The viewport 304 is shown in the diagram of FIG. 3A as being positioned within a representation 302 of a spherical video to facilitate understanding of the various embodiments described herein. In some embodiments, a spherical video captures a 360-degree view of a scene (e.g., a three-dimensional scene). The spherical video can be created by stitching together various video streams, or feeds, that were captured by cameras positioned at particular locations and/or positions to capture a 360 degree view of the scene. FIGS. 3A-F refer to spherical videos as just one example application of the various technology described herein. Depending on the implementation, such technology can be applied to other types of videos apart from spherical videos.

Figure 3B:
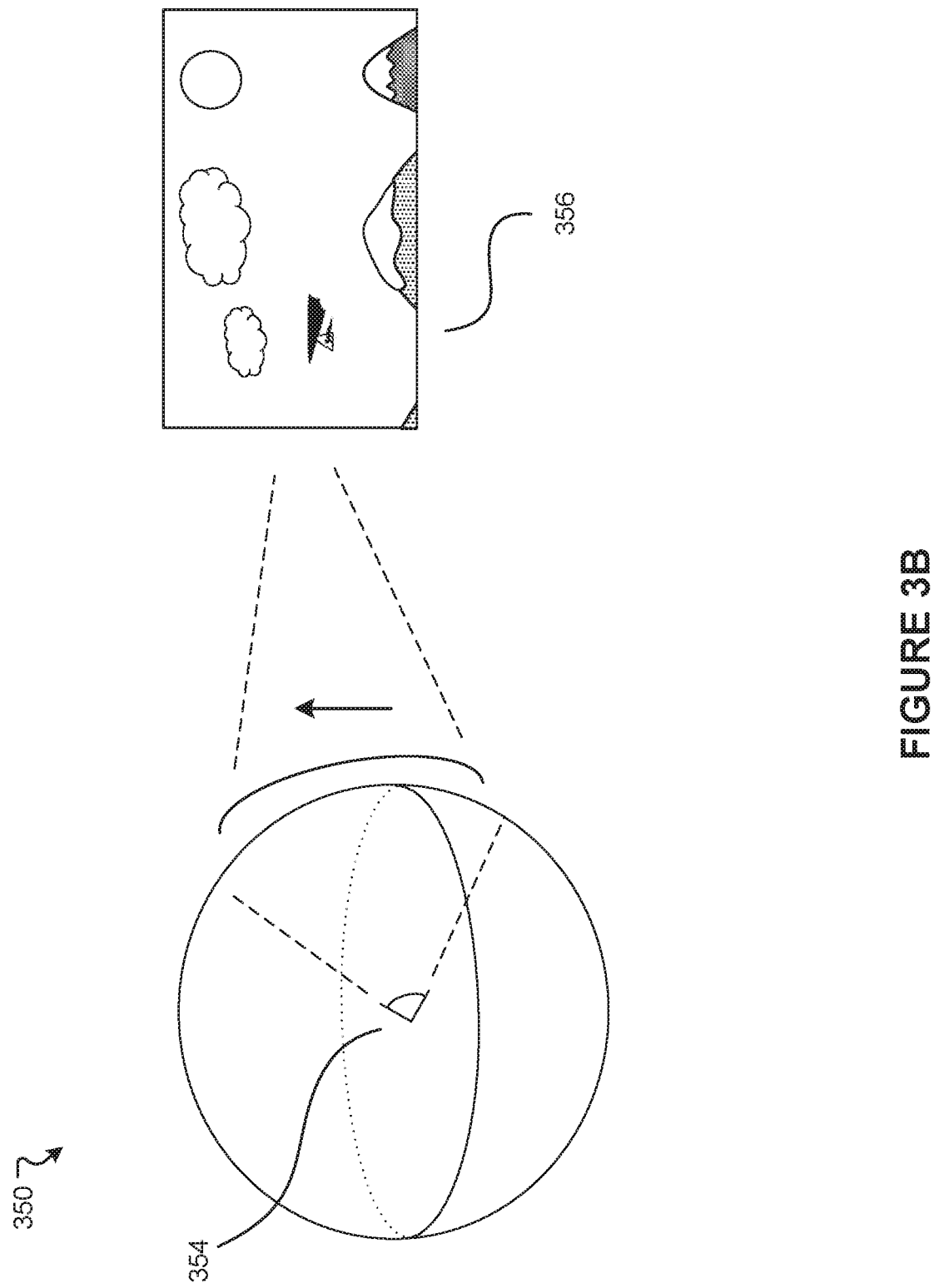

Once stitched together, a user can access, or present, the spherical video through a viewport 304 to view a portion of the spherical video at some angle. The viewport 304 may be accessed through a software application (e.g., video player software) running on a computing device. The stitched spherical video can be projected as a sphere, as illustrated by the representation 302. Generally, while accessing the spherical video, the user can change the direction (e.g., pitch, yaw, roll) of the viewport 304 to access another portion of the scene captured by the spherical video. FIG. 3B illustrates an example 350 in which the direction of the viewport 354 has changed in an upward direction (as compared to viewport 304). As a result, the video stream 356 of the spherical video being accessed through the viewport 354 has been updated (e.g., as compared to video stream 306) to show the portion of the spherical video that corresponds to the updated viewport direction.

The direction of the viewport 304 may be changed in various ways depending on the implementation. For example, while accessing the spherical video, the user may change the direction of the viewport 304 using a mouse or similar device or through a gesture recognized by the computing device. As the direction changes, the viewport 304 can be provided a stream corresponding to that direction, for example, from a content provider system. In another example, while accessing the spherical video through a display screen of a mobile device, the user may change the direction of the viewport 304 by changing the direction (e.g., pitch, yaw, roll) of the mobile device as determined, for example, using gyroscopes, accelerometers, touch sensors, and/or inertial measurement units in the mobile device. Further, if accessing the spherical video through a virtual reality head mounted display, the user may change the direction of the viewport 304 by changing the direction of the user's head (e.g., pitch, yaw, roll). Naturally, other approaches may be utilized for navigating presentation of a spherical video including, for example, touch screen or other suitable gestures.

Figure 3C:
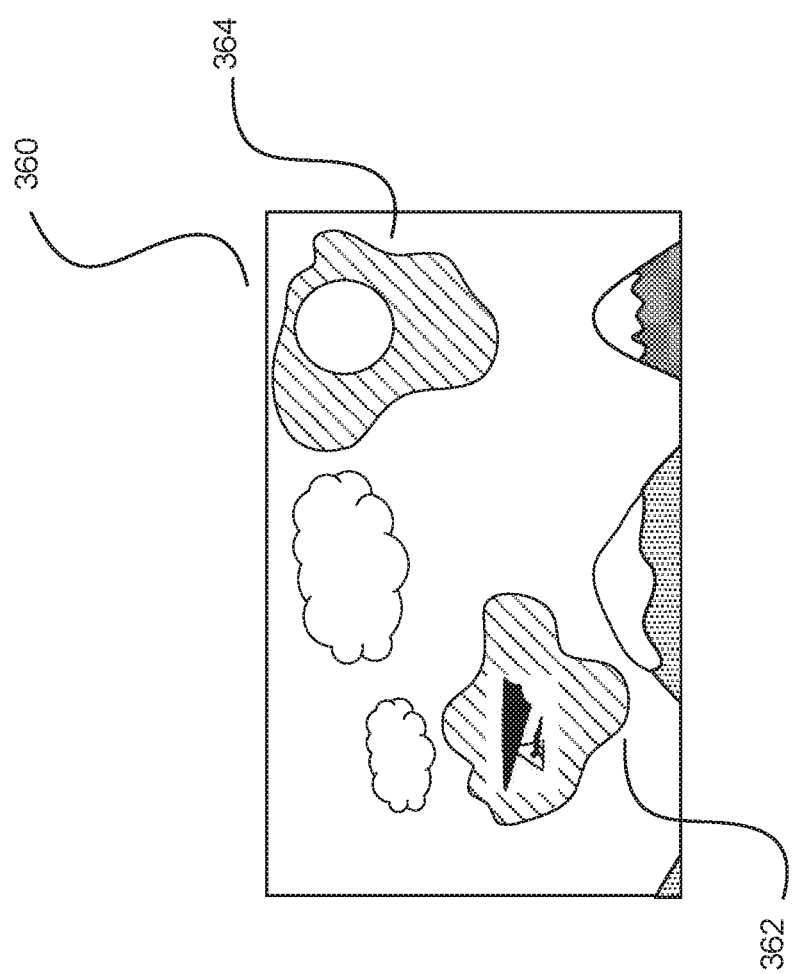
Figure 3D:
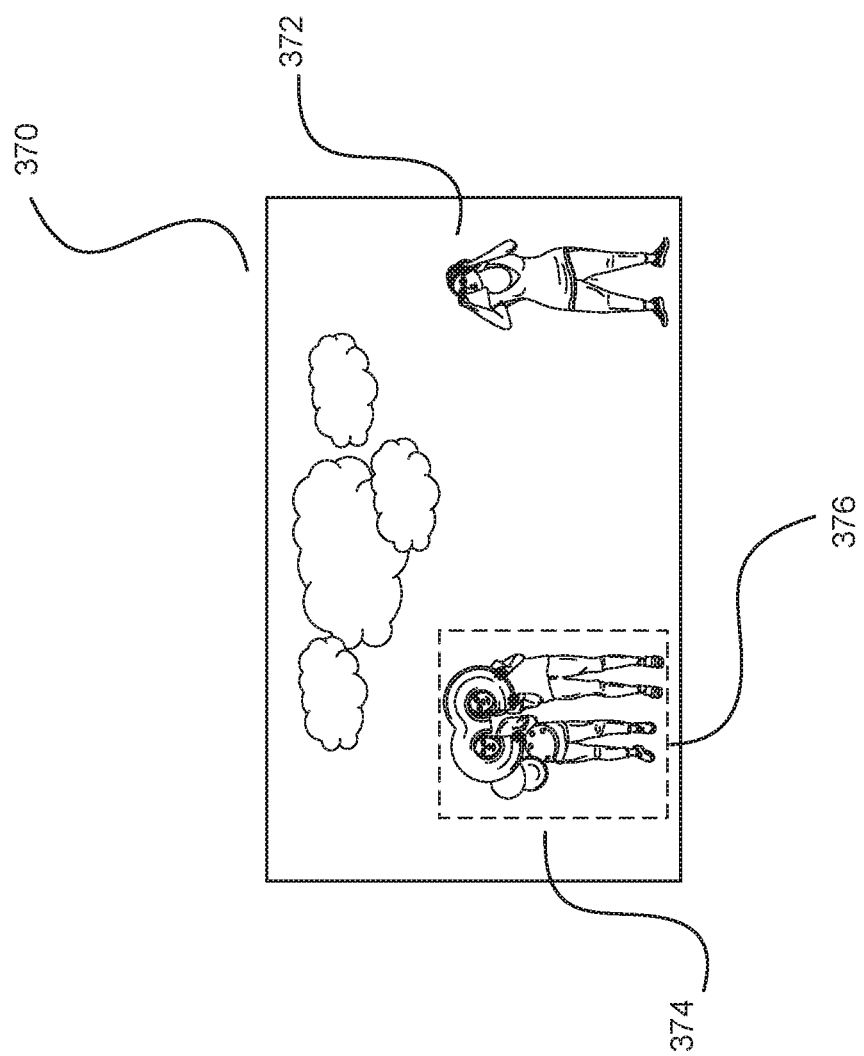
Figure 3E:
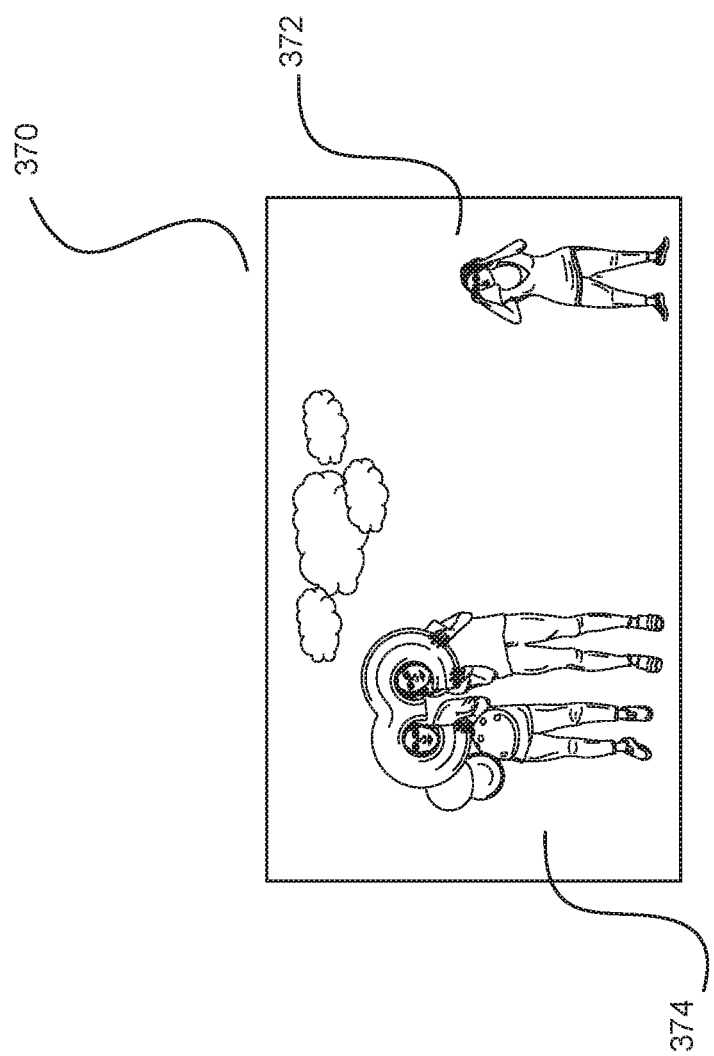
Figure 3F:
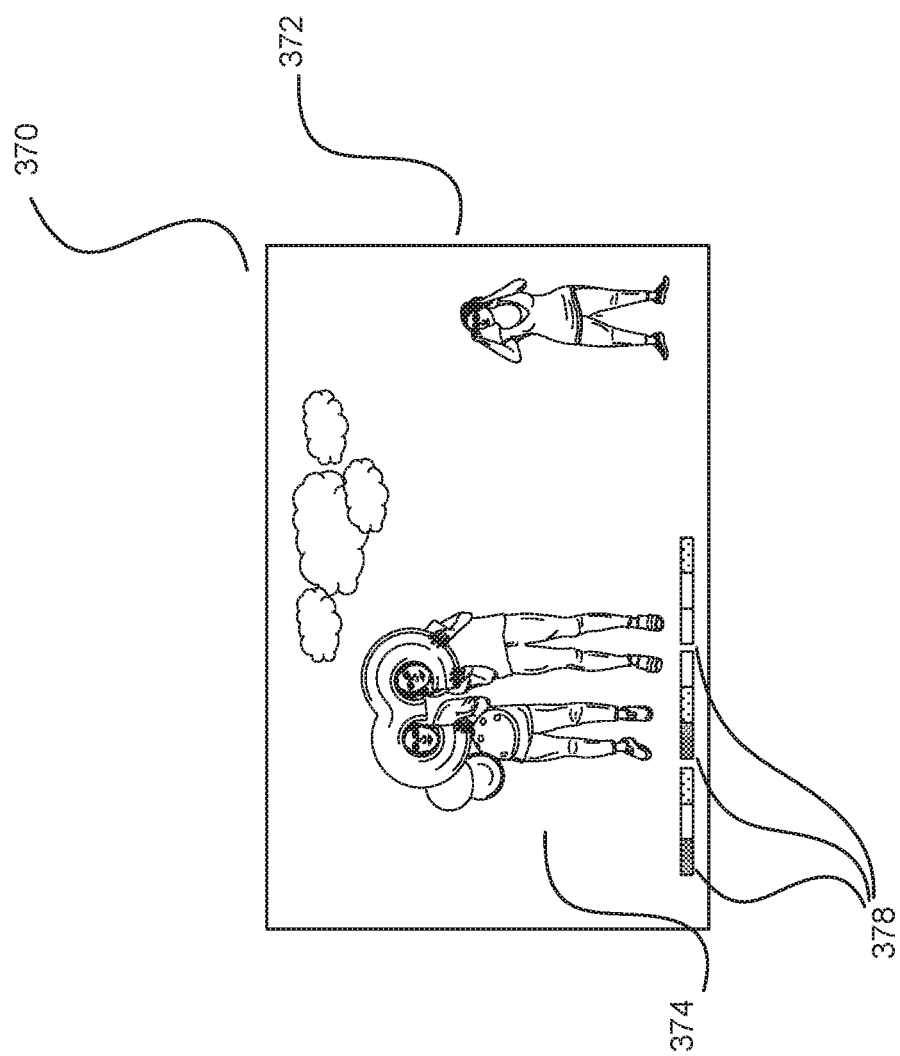

In some embodiments, the stream(s) are provided in real-time based on the determined direction of the viewport 304. For example, when the direction of the viewport 304 changes to a new position, the computing device through which the viewport 304 is being accessed and/or the content provider system can determine the new position of the viewport 304 and the content provider system can send, to the computing device, stream data corresponding to the new position. Thus, in such embodiments, each change in the viewport 304 position is monitored, in real-time (e.g., constantly or at specified time intervals) and information associated with the change is provided to the content provider system such that the content provider system may send the appropriate stream that corresponds to the change in direction. In various embodiments, changes in the direction of the viewport 304 during presentation of the content item are captured and stored. In some embodiments, such viewport tracking data is used to generate one or more user-specific heat maps and/or aggregated heat maps for the content item. For example, FIG. 3C illustrates an example user-specific heat map 360 that was generated based on changes to the user's viewport direction (e.g., view activity) during presentation of the video. In the example of FIG. 3C, the user-specific heat map 360 indicates that the user's attention was focused on a first point of interest 362 and a second point of interest 364 during presentation of the spherical video. This heat map data can be used for myriad applications as described above. For example, in some embodiments, such user-specific heat maps can be aggregated and used to train a saliency prediction model, as described above. The saliency prediction model can be used to determine salient points of interest in various content items. For example, FIG. 3D illustrates an example frame 370 of a content item which includes a first point of interest 372 and a second point of interest 374. The frame 370 can be provided to the saliency prediction model to determine salient points of interest. In this example, the saliency prediction model may determine that the second point of interest 374 is a salient point of interest that is likely to be of interest to users viewing the content item. In some embodiments, the second point of interest 374 (or a region 376 corresponding to the second point of interest 374) can be enhanced visually during presentation of the content item, as described above. In some embodiments, the region 376 can correspond to the contours of the second point of interest 374. For example, in some embodiments, the second point of interest 374 can be presented at a higher zoom level (e.g., zoomed-in) over the remaining regions (including the non-salient first point of interest 372) that appear in the frames, as illustrated in the example of FIG. 3E. As mentioned, information that helps improve the presentation of content can be embedded into frames. In some embodiments, this information may be embedded in the frame 370 as one or more lines of color sequences 378, as illustrated in the example of FIG. 3F.

Figure 4:
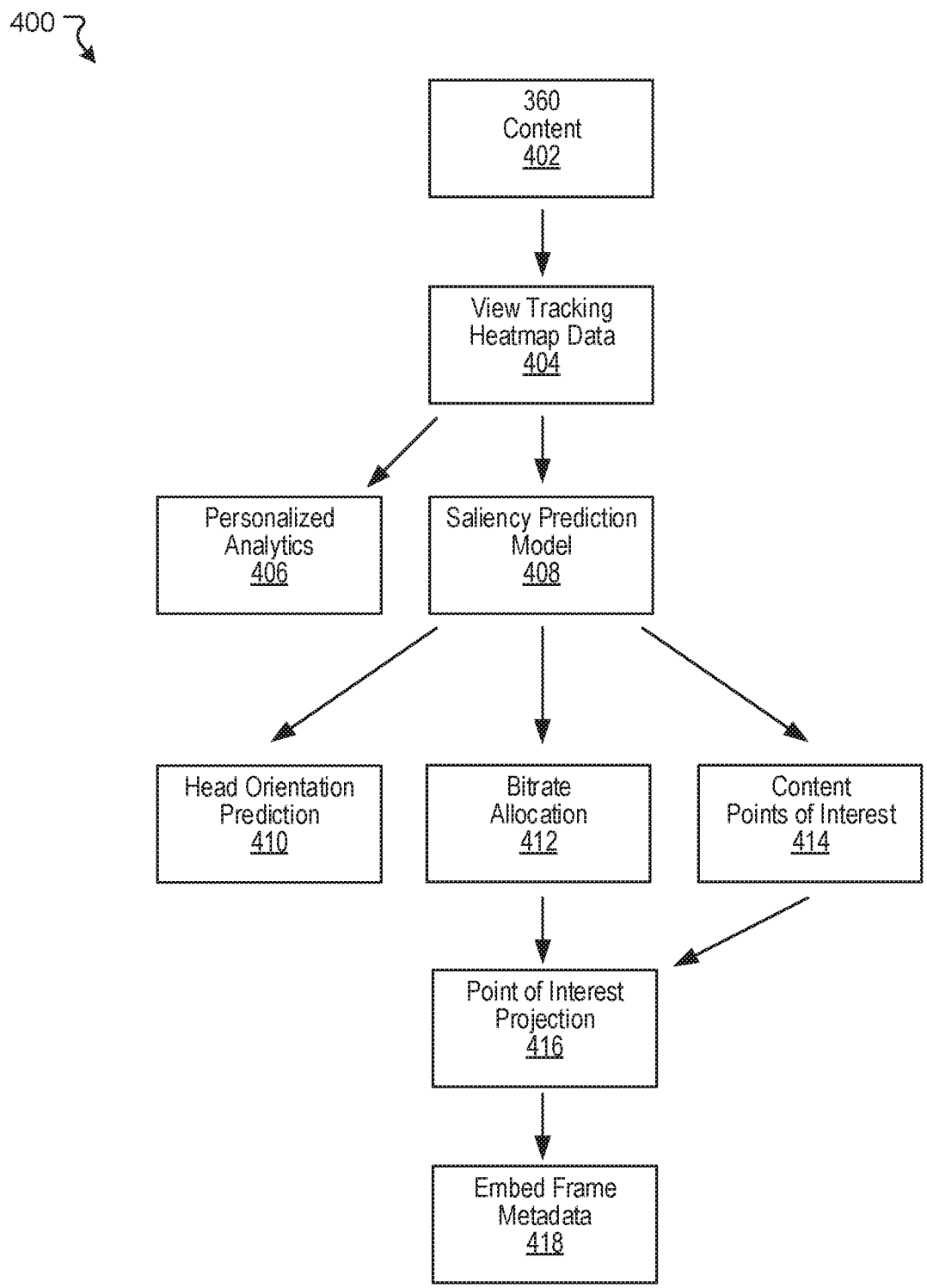
FIG. 4 illustrates an example activity diagram, according to an embodiment of the present disclosure.

FIG. 4 illustrates an example activity diagram 400, according to an embodiment of the present disclosure. It should be appreciated that there can be additional, fewer, or alternative steps performed in similar or alternative orders, or in parallel, within the scope of the various embodiments discussed herein unless otherwise stated.

At block 402, content items to be used for training one or more models (e.g., a saliency prediction model) are obtained. As mentioned, such content items may include videos (e.g., virtual reality content items, immersive videos, etc.). In general, a virtual reality content item (or immersive video) corresponds to any virtual reality media that encompasses (or surrounds) a viewer (or user). Some examples of virtual reality content items include spherical videos, half sphere videos (e.g., 180 degree videos), arbitrary partial spheres, 225 degree videos, and 3D 360 videos. Such immersive videos need not be limited to videos that are formatted using a spherical shape but may also be applied to immersive videos formatted using other shapes including, for example, cubes, pyramids, and other shape representations of a video recorded three-dimensional world.

At block 404, respective view tracking data for each of the content items being used to train the models is obtained. For example, view tracking data for a given content item may be collected for each user (or viewer) that accessed the content item. The view tracking data for a user may identify regions that were accessed through the user's viewport during presentation of the content item. Such view tracking data may be collected for each frame corresponding to the content item. In some embodiments, heat maps for a given content item may be generated based on view tracking data for the content item, as described above. For example, user-specific heat maps can be generated for a given content item based on the respective view activity of those users. In some embodiments, such user-specific heat maps can be combined to generate an aggregated heat map for the content item. This aggregated heat map can indicate which regions in a given frame of the content item were most popular, or interesting, to users that viewed the content item.

At block 406, various approaches for analyzing user view activity can be applied to determine (or predict) user-specific points of interest in a given content item. For example, in some embodiments, a user-specific saliency model can be trained using content items viewed by the user and respective user-specific heat map data. As mentioned, in some embodiments, the heat map data can identify regions that were of interest to the user in a given content item on a frame-by-frame basis. This heat map data can be determined based on the user's interactions with content items during presentation (e.g., sensor data, gesture data, input device data, headset movement data, eye tracking data, etc.) as described above. In some embodiments, the user-specific model can be used to predict which points of interest are likely to be of interest to the user in other content items accessed by the user. Such predictions may be made for stored content items (e.g., video on-demand) and live content items (e.g., live video broadcasts). In some embodiments, the video quality of salient points of interest can be enhanced, for example, by allocating bits (or macroblocks) to regions in frames that correspond to such points of interest.

In some embodiments, one or more frames of a given content item can automatically be extracted to create additional content. For example, a portion of content (e.g., one or more frames) that has been determined to be of interest can be extracted from the content item, for example, as one or more images or a short video. In some embodiments, such portions of interesting content can be identified based on user interactions during presentation of the content item. Such user interactions may be measured using sensor data, gesture data, input device data, headset movement data, eye tracking data, to name some examples. More details describing approaches for automatically extracting content are described in U.S. patent application Ser. No. 15/144,695, filed May 2, 2016, entitled "Systems and Methods for Presenting Content", which is incorporated by reference herein.

At block 408, one or more saliency prediction models can be generated. For example, in some embodiments, a general saliency prediction model can be trained using aggregated heat maps that describe user view tracking data for various content items, as described above. In some embodiments, this saliency prediction model can be used to predict content (e.g., points of interest) that is likely to be of interest to users during presentation of a content item.

At block 410, content (e.g., points of interest) predicted to be of interest by the saliency prediction model can be used to determine changes to a user's head orientation during presentation of a given content item. For example, the content item (or frames of the content item) being viewed by the user can be provided as input to the saliency prediction model. The saliency prediction model can output information indicating which content in the frames is likely to be of interest to the user viewing the content item. In general, the user's head orientation (e.g., viewport) is expected to align with regions in the frames that include content that is likely to be of interest. Such head orientation predictions can be used to improve the delivery of content to users, as described above.

At block 412, bitrate allocation techniques can be applied to improve the quality in which the content predicted to be of interest is presented. For example, additional bits can be allocated to regions in frames that include content (e.g., points of interest) likely to be of interest over other regions in the frames, as described above.

At block 414, content (e.g., points of interest) that appears in frames of a content item can be scored. In some embodiments, content in the frame is scored with respect to the shapes and/or colors represented in an aggregated heat map for the content item, as described above.

At block 416, various projections can be applied to enhance the presentation of points of interest, as described above. In some embodiments, such projections may involve sharpening regions in frames that correspond to salient points of interest. In some embodiments, such projections may involve blurring regions in frames that do not correspond to salient points of interest.

At block 418, information can be embedded into frames of content items, as described above. In some embodiments, frame-dependent information is embedded into each frame of a given content item.

Figure 5:
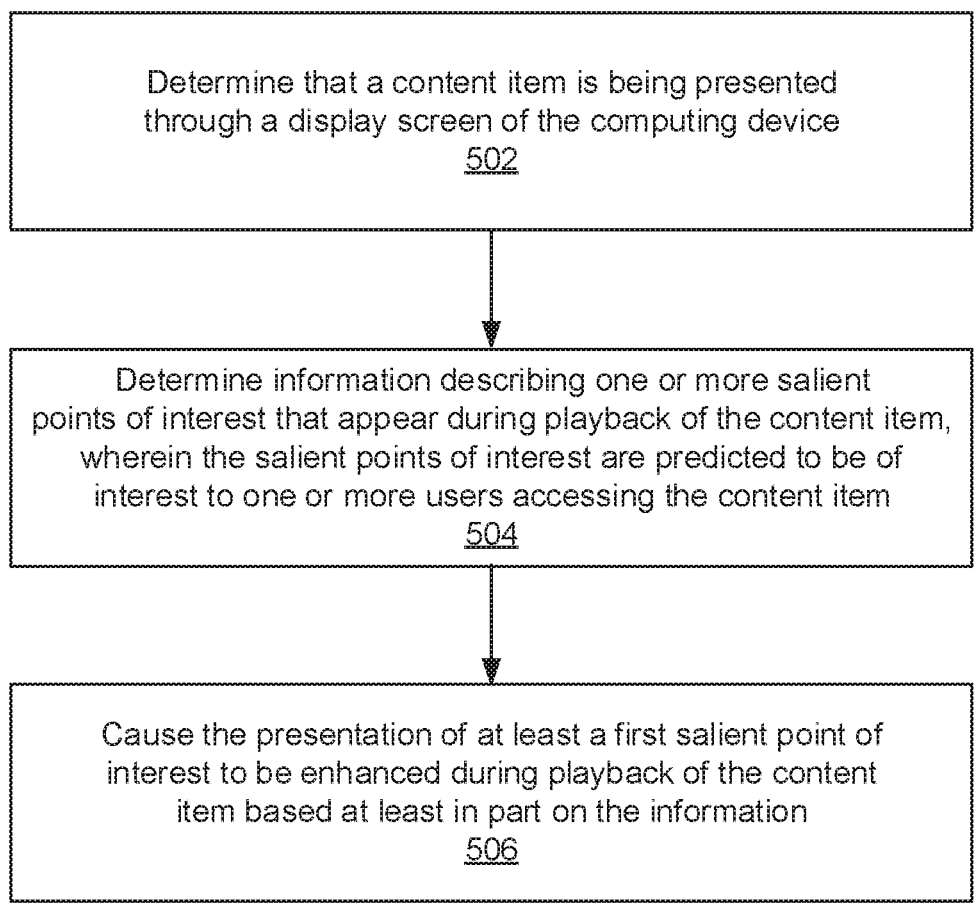
FIG. 5 illustrates an example method, according to an embodiment of the present disclosure.

FIG. 5 illustrates an example method 500, according to an embodiment of the present disclosure. It should be appreciated that there can be additional, fewer, or alternative steps performed in similar or alternative orders, or in parallel, within the scope of the various embodiments discussed herein unless otherwise stated.

At block 502, a determination is made that a content item is being presented through a display screen of the computing device. At block 504, information describing one or more salient points of interest that appear during presentation of the content item is determined. The salient points of interest are predicted to be of interest to one or more users accessing the content item. At block 506, the presentation of at least a first salient point of interest is enhanced during presentation of the content item based at least in part on the information.

Figure 6:
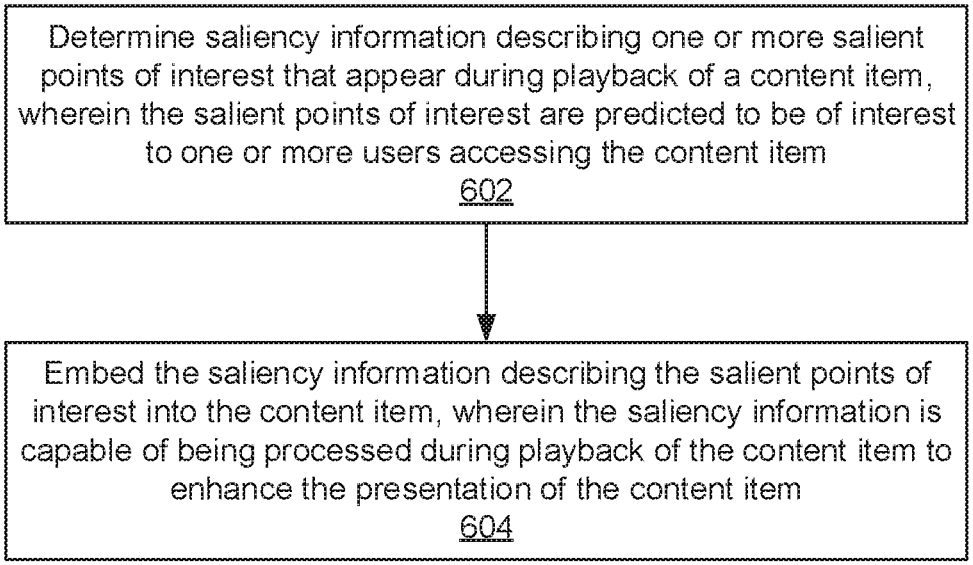
FIG. 6 illustrates another example method, according to an embodiment of the present disclosure.

FIG. 6 illustrates an example method 600, according to an embodiment of the present disclosure. It should be appreciated that there can be additional, fewer, or alternative steps performed in similar or alternative orders, or in parallel, within the scope of the various embodiments discussed herein unless otherwise stated.

At block 602, saliency information describing one or more salient points of interest that appear during presentation of a content item is determined. The salient points of interest are predicted to be of interest to one or more users accessing the content item. At block 604, the saliency information describing the salient points of interest is embedded into the content item. The saliency information is capable of being processed during presentation of the content item to enhance the presentation of the content item.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 7:
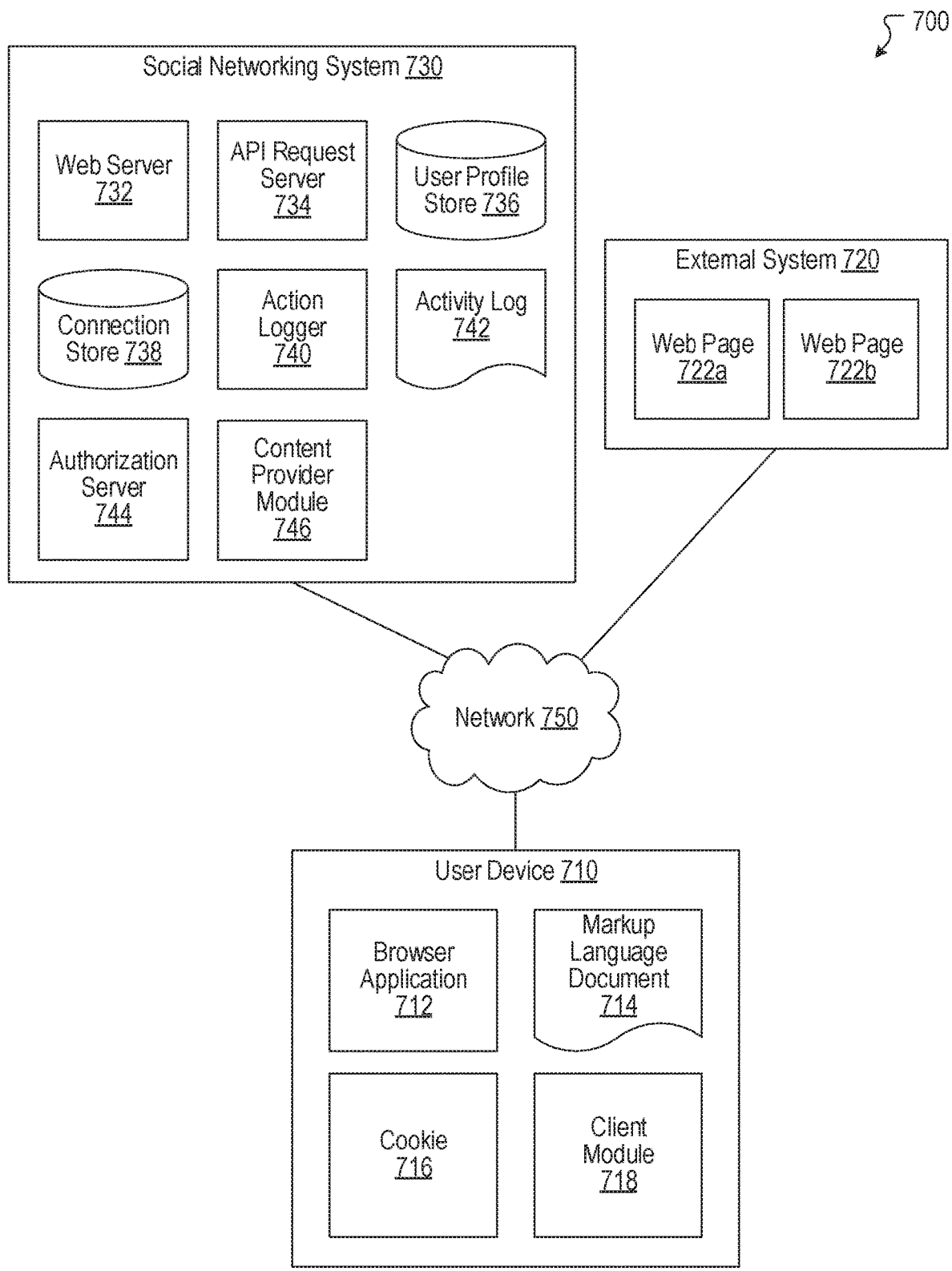
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the Silverlight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content. As discussed previously, it should be appreciated that there can be many variations or other possibilities.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include a content provider module 746. The content provider module 746 can, for example, be implemented as the content provider module 102 of FIG. 1. In some embodiments, the content provider module 746, or some of its features, can be implemented in a computing device, e.g., the user device 710. In some embodiments, the user device 710 can include a client module 718. The client module 718 can, for example, be implemented as the client module 114 of FIG. 1. The network 750 can, for example, be implemented as the network 150 of FIG. 1. As discussed previously, it should be appreciated that there can be many variations or other possibilities.

Hardware Implementation

Figure 8:
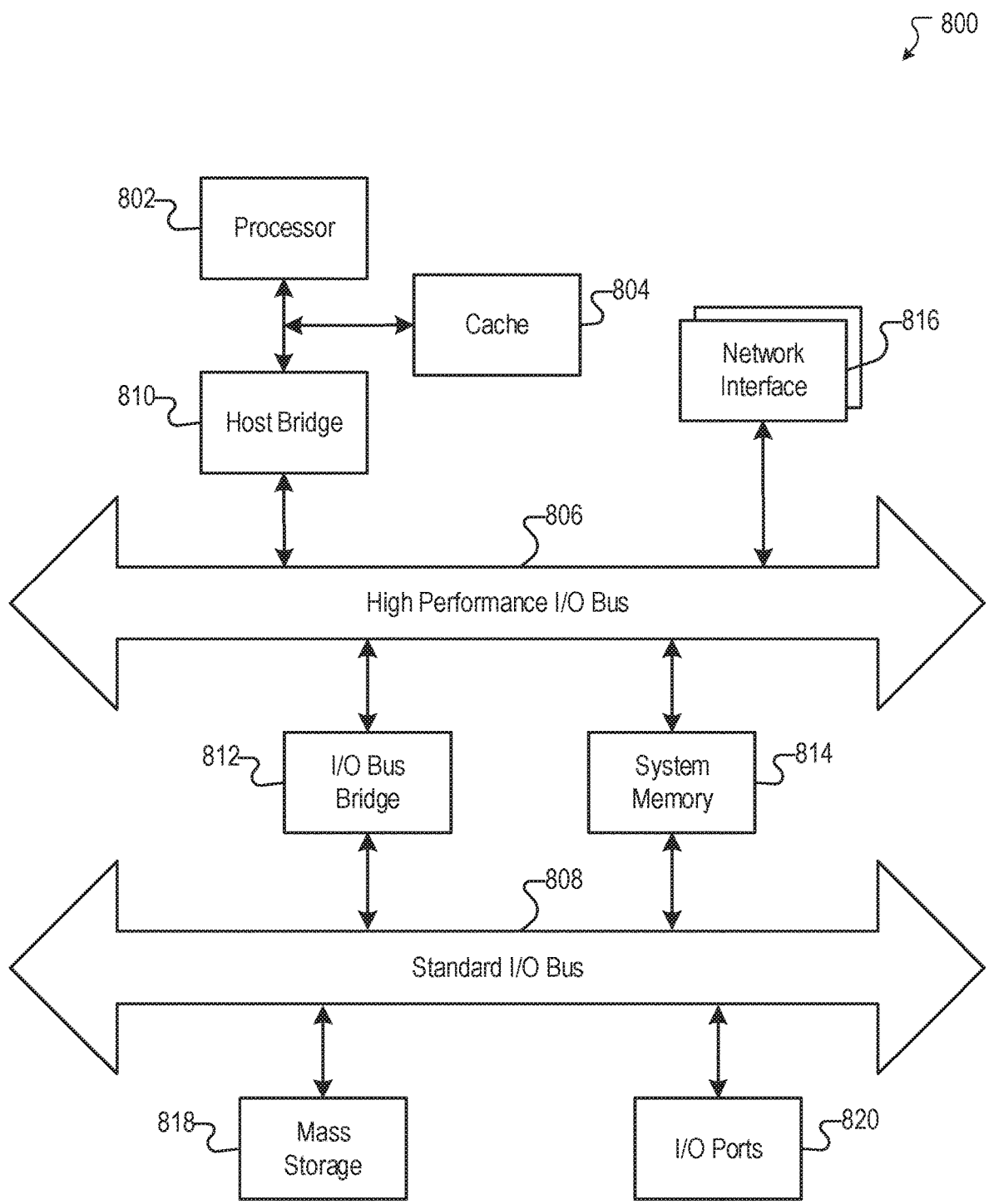
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing device, that a content item is being presented through a display screen of the computing device;
   determining, by the computing device, a publisher associated with the content item being presented;
   determining, by the computing device, information describing one or more salient points of interest that appear during presentation of the content item, wherein the salient points of interest are predicted to be of interest to one or more users accessing the content item based at least in part on a publisher-specific saliency prediction model for the publisher, the publisher-specific saliency prediction model being trained using user-specific view tracking data corresponding to one or more different content items that correspond to the publisher; and
   causing, by the computing device, presentation of at least a first salient point of interest to be enhanced during presentation of the content item based at least in part on the information.

2. The computer-implemented method of claim 1, wherein causing the presentation of at least a first salient point of interest to be enhanced further comprises:
   increasing, by the computing device, a video quality at which a region corresponding to the first salient point of interest is presented by some specified amount.

3. The computer-implemented method of claim 1, wherein causing the presentation of at least a first salient point of interest to be enhanced further comprises:

increasing, by the computing device, a zoom level of a region corresponding to the first salient point of interest by some specified amount.

4. The computer-implemented method of claim 3, wherein the region corresponds to the contours of the first salient point of interest.

5. The computer-implemented method of claim 1, wherein causing the presentation of at least a first salient point of interest to be enhanced further comprises:
causing, by the computing device, regions other than the region corresponding to the first salient point of interest to appear blurred by some threshold amount.

6. The computer-implemented method of claim 1, wherein causing the presentation of at least a first salient point of interest to be enhanced further comprises:
causing, by the computing device, a portion of the first salient point of interest to appear at a higher quality than the remaining portions of the first salient point of interest.

7. The computer-implemented method of claim 1, wherein one or more frames corresponding to the first salient point of interest are encoded so that regions of the frames corresponding to the first salient point of interest are presented at a higher quality than the remaining regions of the frames.

8. The computer-implemented method of claim 1, wherein the content item is a virtual reality content item created by stitching together a set of video streams that capture one or more scenes.

9. The computer-implemented method of claim 1, wherein determining information describing one or more salient points of interest that appear during presentation of the content item further comprises:
obtaining, by the computing device, information describing the salient points of interest from aggregated heat map data corresponding to the content item.

10. A system comprising:
determining that a content item is being presented through a display screen of a computing device;
determining a publisher associated with the content item being presented;
determining information describing one or more salient points of interest that appear during presentation of the content item, wherein the salient points of interest are predicted to be of interest to one or more users accessing the content item based at least in part on a publisher-specific saliency prediction model for the publisher, the publisher-specific saliency prediction model being trained using user-specific view tracking data corresponding to one or more different content items that correspond to the publisher; and
causing presentation of at least a first salient point of interest to be enhanced during presentation of the content item based at least in part on the information.

11. The system of claim 10, wherein causing the presentation of at least a first salient point of interest to be enhanced further causes the system to perform:
increasing a video quality at which a region corresponding to the first salient point of interest is presented by some specified amount.

12. The system of claim 10, wherein causing the presentation of at least a first salient point of interest to be enhanced further causes the system to perform:
increasing a zoom level of a region corresponding to the first salient point of interest by some specified amount.

13. The system of claim 12, wherein the region corresponds to the contours of the first salient point of interest.

14. The system of claim 10, wherein causing the presentation of at least a first salient point of interest to be enhanced further causes the system to perform:
causing regions other than the region corresponding to the first salient point of interest to appear blurred by some threshold amount.

15. A non-transitory computer-readable storage medium including instructions that, when executed by at least one processor of a computing system, cause the computing system to perform a method comprising:
determining that a content item is being presented through a display screen of a computing device;
determining a publisher associated with the content item being presented;
determining information describing one or more salient points of interest that appear during presentation of the content item, wherein the salient points of interest are predicted to be of interest to one or more users accessing the content item based at least in part on a publisher-specific saliency prediction model for the publisher, the publisher-specific saliency prediction model being trained using user-specific view tracking data corresponding to one or more different content items that correspond to the publisher; and
causing presentation of at least a first salient point of interest to be enhanced during presentation of the content item based at least in part on the information.

16. The non-transitory computer-readable storage medium of claim 15, wherein causing the presentation of at least a first salient point of interest to be enhanced further causes the computing system to perform:
increasing a video quality at which a region corresponding to the first salient point of interest is presented by some specified amount.

17. The non-transitory computer-readable storage medium of claim 15, wherein causing the presentation of at least a first salient point of interest to be enhanced further causes the computing system to perform:
increasing a zoom level of a region corresponding to the first salient point of interest by some specified amount.

18. The non-transitory computer-readable storage medium of claim 17, wherein the region corresponds to the contours of the first salient point of interest.

19. The non-transitory computer-readable storage medium of claim 15, wherein causing the presentation of at least a first salient point of interest to be enhanced further causes the computing system to perform:
causing regions other than the region corresponding to the first salient point of interest to appear blurred by some threshold amount.

* * * * *